United States Patent [19]

Reichle

[11] Patent Number: 4,667,013

[45] Date of Patent: May 19, 1987

[54] PROCESS FOR ALKYLENE OXIDE POLYMERIZATION

[75] Inventor: Walter T. Reichle, Warren, N.J.

[73] Assignee: Union Carbide Corporation, Danbury, Conn.

[21] Appl. No.: 858,914

[22] Filed: May 2, 1986

[51] Int. Cl.$^4$ ............................................. C08G 65/12
[52] U.S. Cl. ................................................... 528/414
[58] Field of Search ......................................... 528/414

[56] References Cited

U.S. PATENT DOCUMENTS

| | | |
|---|---|---|
| 3,382,192 | 5/1968 | Kawamura et al. |
| 3,385,800 | 5/1968 | Furukawa et al. ................ 528/414 |
| 3,639,267 | 2/1972 | Vandenberg .................... 528/414 X |

FOREIGN PATENT DOCUMENTS

| | | | |
|---|---|---|---|
| 45-07751 | 3/1970 | Japan | ................................. 528/414 |
| 49-23839 | 6/1974 | Japan | ................................. 528/414 |
| 53-27319 | 8/1978 | Japan | ................................. 528/414 |

OTHER PUBLICATIONS

Shoichi Asano, et al., *J. Chem. Soc., Chem. Commun.* 1985, 1148–9.
Bruce and Rabigliati, *Polymer (London)*, 8, 361–367 (1966).

*Primary Examiner*—Earl Nielsen
*Attorney, Agent, or Firm*—Henry H. Gibson

[57] ABSTRACT

The molecular weight of polyalkylene oxides produced by the polymerization of a cyclic oxide in contact with a catalyst comprising the reaction product of a dihydrocarbyl zinc compound and a linear alkanediol in contact with a silica dispersion aid and nonionic surfactant in an inert diluent is controlled by the continuous addition of a very dilute solution of chain transfer agent having a pKa value of from 9 to 22 to the polymerizing mixture during the polymerization reaction at a carefully controlled rate so as not to terminate the polymerization reaction.

36 Claims, No Drawings

PROCESS FOR ALKYLENE OXIDE POLYMERIZATION

I. FIELD OF THE INVENTION

This invention relates to a method of controlling the molecular weight of alkylene oxide polymers produced with zinc alkoxide catalyst compositions by the use of certain active hydrogen containing compounds as chain transfer agents.

Description of the Prior Art

The polymerization of ethylene oxide and propylene oxide to produce high molecular weight polymers and copolymers has been known for a long time and the literature contains hundreds of references pertaining to this subject. The alkylene oxides have been polymerized using a wide variety of catalysts based on metal atoms including oxides and/or hydroxides of transition metals, such as iron, as well as main group metals, such as magnesium, aluminum, zinc and calcium. In some instances, as with calcium based catalysts, the catalyst may be an ammonia-modified amide/metal alkoxide; however, such catalysts often leave the resulting polymer with an undesirable odor of ammonia and amine that is difficult to remove. Other catalysts suffer from various disadvantages such as difficulty of preparation, irreproducible polymerization rates, lack of molecular weight control, or, in some instances product instability of either the catalyst or the polymer. In general, the control of the molecular weight of the polymer is difficult, if not impossible, and polymers of extremely high molecular weight are usually obtained.

The catalysts containing the zinc atom have been known for many years, but for various reasons they have not shown widespread commercial acceptance. Nevertheless, continued efforts have been made to modify and improve them since the rates are not as high as desired in commercial operations, or the product is highly colored, as when porphyrin metal complexes are used as the catalyst. Recently the applicant discovered an improved zinc based catalyst that is the subject of a separate patent application; however, those catalysts per se are not this invention. This invention pertains to the use of certain chain transfer agents, preferably certain alkanols, to control the molecular weight of the polyalkylene oxide resins produced.

Illustrative of information in the literature concerning the use of alcohols in processes for the production of polyalkylene oxides are the following publications.

U.S. Pat. No. 3,382,192, issued May 7, 1968 to Shun Kawamura et al. discloses a catalyst composition composed of a mixture of (a) alumina or silica and (b) a zinc alkoxide or aluminum alkoxide or the reaction product of a dialkylzinc or trialkylaluminum compound with water or an alkanol in a sealed reactor. It does not disclose or suggest the continuous feed of a chain transfer agent to the polymerizing mixture throughout the reaction; in fact, it makes no mention whatsoever of the concept of using a chain transfer agent to control the molecular weight of the polymer.

A more recent publication is an article by Shoichi Asano et al., entitled "'Immortal' Polymerization. Polymerization of Epoxide Catalyzed by an Aluminum Porphyrin-Alcohol System"; J. Chem. Soc., Chem. Commun. 1985, 1148-9. This reference teaches that in the presence of a protic compound, methanol, the number of polymer molecules increases and is no longer equal to the number of initiator molecules charged but is greater. The methanol participates in the reaction as a chain transfer agent without killing the reaction; the polymer has a narrower molecular weight distribution. This reference does not indicate the manner in which the alcohol is added to the reaction; nor does it disclose or suggest the continuous feed of a chain transfer agent to the polymerizing mixture throughout the reaction.

The article by J. M. Bruce and F. M. Rabagliati entitled "The Polymerization of Some Epoxides by Diphenylzinc, Phenylzinc t Butoxide, and Zinc t-Butoxide"; Polymer (London) 8, 361-367 (1966), discusses the effect of t-butyl alcohol on yield and molecular weight, both of which are reduced. It appears from the article that the t-butyl alcohol was initially present as the solvent medium for the polymerization reaction as was done in the other experiments (except experiment 7) reported in Tables 4 and 5 of this publication in which solvents were used. The reference does not disclose the manner of addition of this invention and the importance of controlling the amount of alcohol added; it does not suggest or disclose the continuous feed of a chain transfer agent to the polymerizing mixture throughout the reaction.

III. SUMMARY OF THE INVENTION

This invention is based on the discovery that certain compounds containing active hydrogen atoms act as chain transfer agents when added to the catalytic polymerization of alkylene oxides. These chain transfer agents serve to control the molecular weight of the polyalkylene oxide produced and enable the production of the lower molecular weight polymers which heretofore have generally been produced by an after-treatment of the high molecular weight products, such as irradiation. The invention is applicable with the catalysts based on the metals zinc, titanium, magnesium, calcium, strontium, barium and aluminum, but most particularly with the alkoxides of zinc.

IV. DETAILED DESCRIPTION OF THE INVENTION

The polymerization of alkylene oxides, e.g., ethylene oxide, propylene oxide, or mixtures thereof, using a metal alkoxide catalyst, for instance the zinc alkoxides, is normally considered as not involving a chain termination step. It is for this reason that there is no simple way of regulating the polymer molecular weight except by changing the monomer - catalyst ratio. In commercial practice, however, this is not a practical procedure since it would require use of large quantities of catalyst in order to obtain low molecular weight polymers which would then result in uncontrollably high reaction rates. The finite heat transfer capabilities of commercial units makes such operation impractical. Conversely, for high molecular weight polymers the very low catalyst concentrations which may have to be used may lead to very low reaction rates and long induction periods. Hence, a method for regulating the molecular weight of the polymer while simultaneously producing it at a commercially acceptable rate has long been a desired goal but presently no practical method is available that would permit achieving these goals when polyalkylene oxides are produced using the non-transition metal alkoxide catalyst compositions.

It has now been found that certain compounds containing active hydrogen atom will permit production of a predetermined molecular weight polyalkylene oxide in an economical and efficient manner. This is accomplished by the slow, continuous feeding of a very dilute solution of the chain transfer agent in an inert medium to the reactor throughout the polymerization reaction. One can also, if one wishes, add the required amount of chain transfer agent to the alkylene oxide monomer and feed this mixture to the reactor throughout the polymerization reaction. Another manner is introduction of the chain transfer agent to the reactor in the required small amounts as a vapor, either below the surface of the polymerizing mixture or above its surface. Whichever procedure is followed, careful control of the amount of chain transfer agent introduced into the reactor during the polymerization reaction is necessary. When properly conducted, this invention permits the addition of the active hydrogen atom compound (the chain transfer agent) in a manner that will not unduly depress the rate of polymerization and allow production of a polymeric product within the desired molecular weight range.

The polymerization of alkylene oxides of the formula:

wherein R' is hydrogen or alkyl of from 1 to 20 carbon atoms, preferably methyl, to homopolymers or copolymers is considered as being a coordination - insertion reaction which has no obvious chain termination or chain transfer reactions during chain growth. This results in uncontrollably high polymer molecular weights. It was found that certain active hydrogen containing compounds, herein also referred to as chain transfer agents, will result in a chain transfer reaction and thereby regulate and reduce the polymer molecular weight. In principle, an equilibrium exists between the chain transfer agent (AH) and the growing polymer chain

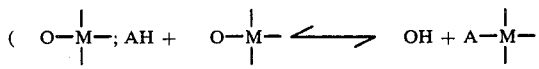

the extent of which depends on the pKa of the chain transfer agent. As is known, the pKa value is defined by the equation:

$$pKa = -\ln \frac{[H^+][A^-]}{[AH]}$$

A compound with a low pKa, equal to or less than 8, will push the reaction equilibrium to the right, or product side, and, unless the resulting

is itself reactive with the alkylene oxide, will serve as a chain terminator, and result in terminating the reaction.

A compound with a higher pKa, equal to or greater than 23, will not be able to displace the

to effect chain transfer. The equilibrium will be to the left, or reagent side, and the polymer chain will continue to grow and form higher molecular weight polymer molecules.

The active hydrogen containing chain transfer agents useful in this invention have a pKa in the range of the pKa of the displaced alcohol ether (e.g., —OCH$_2$CH$_2$OH) of from about 9 to about 22, preferably from 14 to 20 and most preferably from 15 to 19. The chain transfer agents should be minimally sterically constrained and have a van der Waals size not too much larger than that of the alkylene oxide itself, which for ethylene oxide is less than about seven Angstroms. Additionally, the chain transfer agent should result in formation of an

moiety that is a catalytically active site for polymerization of alkylene oxide and formation of a new polymer chain.

The need for minimal sterical constraint for the chain transfer agent is important because it must have the capability of diffusing through preformed polymer matrix or pores within the polymer molecule to the catalytically active surface in order to cause chain transfer to take place. If the chain transfer agent is too large to diffuse through, then it cannot reach the catalyst surface and effect the chain transfer reaction.

The pKa of the chain transfer agent is important since a pKa value greater than 22 will not displace the equilibrium far enough to the product side in order for a significant amount of chain transfer to take place.

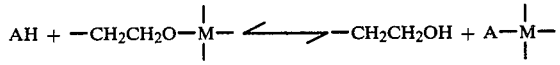

the weak acids having these higher pKa values are excluded.

The further requirement that the resulting

moiety formed be a catalytically active site is important otherwise the polymerization reaction will terminate. The presence of a new catalytically active site makes available a site for the formation of a new polymer chain and permits continuation of the polymerization reaction. Thus, use of a hydrocarbon acid similar to cyclopentadiene (which has a pKa of 15) having a pKa of 9 to 22 will not form a reactive site, but will form a —C—Zn— bond which will not be catalytically active since alkylene oxides do not insert into a —C—Zn— bond.

The pKa values are readily available in many publications, for example, "The Chemists Companion, A Handbook of Practical Data, Techniques, and References", Arnold J. Gordon and Richard A. Ford, published by John Wiley & Sons, New York, pages 59 to 63.

Though any chain transfer agent that meets the requirements indicated can be used, the preferred are the alcohols, R'''OH, having the proper pKa values and meeting the other requirements stated above, wherein R''' is a linear or branched alkyl group having from 1 to about 16 carbon atoms, preferably from 1 to 8 carbon atoms and most preferably from 1 to 4 carbon atoms.

The manner in which the chain transfer agent is added to the polymerization reaction is important. It must be added after the polymerization reaction has commenced. It must also be added in a continuous and controlled manner throughout the duration of the polymerization reaction and not in periodic portions during the polymerization reaction. In order to avoid termination of the polymerization reaction the chain transfer agent is introduced into the reaction as a dilute solution in an inert medium, in gaseous form or in admixture with the alkylene oxide. Though any inert medium that does not affect the polymerization reaction can be used, it is preferably the same hydrocarbon reaction medium used in the reaction. These are well known to those of average skill in this field of polymer production. When added in gaseous form it can be diluted with an inert gas or with the monomer. The chain transfer agent must not have polar groups in the molecule which bond strongly to the

moiety and thereby inhibit further polymerization, an example of such a compound being 2-hydroxypyridine, nor any group which may poison the catalyst and render it ineffective. Indicative of undesirable groups are sulfide, sulfoxide, sulfone, carbonyl from esters and ketones.

As previously indicated, the chain transfer agent can be added to the polymerization reaction as a dilute solution in an inert medium. This concentration is below about three percent by weight and preferably about one percent by weight or less. The dilute solution is fed continuously, at a carefully controlled rate, so as not to terminate the polymerization reaction to the polymerizing system throughout the reaction after the polymerization has commenced. The total amount of chain transfer agent added is from about 0.005 to about 0.4 mole per 1,000 g of polymer produced; preferably it is from about 0.01 to about 0.15 mole per 1,000 g of polymer produced. The rate of addition, as previously indicated, must be carefully controlled by known means so that the polymerization is not terminated. Further, as the amount of chain transfer agent is increased it may be necessary to increase the amount of catalyst present in order to maintain an adequate polymerization rate. Thus, higher concentrations of the chain transfer agent in the inert medium usually require a slower rate of addition to the reactor. The R'''OH chain transfer agent reacts with the growing polyalkylene oxide chain to terminate it, substitute the R'''O— portion in its place, and start a new chain, thus perpetuating the polymerization reaction and at the same time controlling, by decreasing, the molecular weight of the polymer molecule. As is known, additional incremental portions of the catalyst can be added during the polymerization reaction if desired or necessary.

Though this invention has broad applicability to different catalysts it finds particular utility with new catalyst compositions recently discovered by the same inventor that are the basis of a separate and distinct patent application, the details of which follow.

The new catalyst compositions are based on certain dispersions of alkoxides and aryloxides of zinc, dispersion aid and surfactant. The catalysts are prepared by the reaction of a polyol with a hydrocarbyl zinc compound, as hereinafter more fully described, and are in the form of very fine particles that may be dispersed in an inert, generally hydrocarbon, medium. They have a controlled particle size, high surface area and porosity, and consequently exhibit controlled activities or polymerization rates.

In the catalyst producing process, the important feature is the presence of certain defined dispersing aids during the reaction of the polyol with the hydrocarbyl zinc. Another feature that assists in the production of the high activity catalyst is the presence of a surfactant, most preferably a nonionic surfactant, during the reaction. The use of surfactant and dispersion aid are critical features in preparation of the catalyst.

The catalyst compositions are produced by reacting a dihydrocarbyl zinc with an emulsion of a polyol surfactant dispersion aid, all in an inert medium, to yield a dispersion of fine solid particles.

The zinc compounds are preferably the alkyls and aryls of the general formula $R_2Zn$ in which R is (i) an alkyl group containing from 1 to about 8 carbon atoms, preferably 1 to 6 carbon atoms, and most preferably 2 or 3 carbon atoms, or (ii) phenyl or naphthyl or alkyl-substituted phenyl or naphthyl groups in which the alkyl groups contain from 1 to about 3 carbon atoms, or (iii) cycloalkyl groups containing from 4 to 6 ring carbon atoms; or (iv) the dicyclopentadienyl group. Illustrative thereof are dimethylzinc, diethylzinc, dipropylzinc, di-isopropylzinc, dibutylzinc, di-isobutylzinc, di-t-butylzinc, the dipentylzinc salts, the dihexyl-and diheptyl- and dioctylzinc salts, di-2-ethylhexylzinc, diphenylzinc, ditolylzinc, dicyclobutylzinc, dicyclopentylzinc, di-methylcyclopentylzinc, dicyclohexylzinc, methyl phenylzinc, methyl tolylzinc, methyl naphthylzinc, ethyl phenylzinc, and similar known compounds. The nature of the zinc compounds is not critical but those possessing some solubility in the reaction medium employed are generally preferred.

The polyols reacted with the zinc compound are preferably the diols. The nature of the polyol appears to be important and may be critical. While active catalysts can be made from a wide variety of polyols, best catalytic activity appears to be obtained by the use of the linear alkanediols, particularly good catalytic activity, as evidence by yield and rate, being achieved with 1,4-butanediol. In addition to the alkanediols, one can use a polyhydric phenol such as resorcinol, catechol, the cyclohexane diols, hydroquinone, and similar compounds. The alkanediols include the alkanediols having from 2 to about 6 carbon atoms in the alkylene chain, preferably 4 carbon atoms, and the cycloalkanediols having 5 or 6 ring carbon atoms, or mixtures thereof.

Illustrative thereof are ethylene glycol, diethylene glycol, triethylene glycol, 1,3-propanediol, 2-hydroxyethoxyisopropanol, 1,4-butanediol, 1,5-pentanediol, 1,6-hexanediol, cyclopentanediol, methylcyclopentanediol, cyclohexanediol, glycerine, and similar compounds, or mixtures thereof.

Any inert hydrocarbon medium can be used as the medium in producing the catalyst. These compounds are well known to those of ordinary skill in the art and illustrative thereof are hexane, isopentane, heptane, octane, benzene, toluene, decalin, or mixtures of these and/or other inert hydrocarbons.

The dispersion aid is, to a certain extent, quite critical and not all known materials can be used. It serves two primary purposes: it helps to establish a dispersion of the polyol in the hydrocarbon medium and it serves as a source of nuclei for the polyol dispersion droplets. The dispersion aid has an average particle size of less than about 10 nm (10 nanometers) in size, it is preferably less than about 5 nm, and can be as low as 0.5 nm. It also has a highly polar surface. Though it is known that many silicas, aluminas, magnesias and titanias are useful as catalysts or catalyst supports, it has been found that essentially most of these may not be useful as dispersion aids in this invention for one reason or another in that they do not consistently produce a catalyst of sufficiently high activity for the cyclic oxiranes, or they do not produce a catalyst having commercially acceptable polymerization rates, or they do not permit consistent reproduction of a catalyst composition from batch to batch. It was found that a certain type of dispersion aid will overcome many of these deficiencies; this finding or discovery being completely unexpected and unpredictable. It was found that the use of a limited group of fumed metal or non metal oxides, for example, those of titanium, silicon, aluminum, zinc, iron and magnesium, formed stable, fine particle size catalyst dispersions and that, in particular, fumed silica, unexpectedly and unpredictably permits the production of a zinc-based catalyst which outperforms previously known zinc-based catalysts for the polymerization of cyclic oxirane compounds. The fumed oxides useful in this invention are known to those of ordinary skill in the art and many are commercially available. They preferably have an average particle size of less than about 10 nm, have a highly polar surface, have a high surface area of from about 10 to about 600 square meters per gram (10–600m$^2$/g BET/N$_2$), preferably above about 300 square meters per gram, and the surface of which is covered with —OH groups rendering the material hydrophilic. It was observed that fumed silica having its surface covered with —OSi(CH$_3$)$_3$ groups did not produce an active catalyst. Generally, before using the fumed oxide to produce the catalyst compositions of this invention, it is dried at elevated temperature (e.g., 200° C.) for a period of time to remove adsorbed water, even though undried material may be used. Among the suitable oxides are fumed silica and fumed alumina. Preferred forms for the preparation of catalysts used for the polymerization of ethylene oxide and propylene oxide are the fumed silicas, since they yield catalysts of high activity and polymerization rates for this reaction. A convenient source of fumed silica is available and known as Aerosil-380 ® (Degussa).

The use of a surfactant is beneficial in that it improves the stability of the dispersion during preparation of the catalyst composition and after; so that only prolonged stoppage of agitation leads to phase separation and in the event phase separation does occur the dispersion is more readily reconstituted. The preferred surfactants are the nonionic surfactants well known to those of ordinary skill in the art. A preferred class is the nonionic alkylaryl alkoxylates in which the alkyl group contains from about 4 to about 18 carbon atoms and the alkoxylate group is ethyleneoxy and there are from about 2 to about 20 ethyleneoxy units in the molecule; e.g., the 4-mole and 10-mole ethyleneoxy adducts of p-nonylphenol. One can also use the adducts in which the alkoxylate group is propyleneoxy or a mixture of ethyleneoxy and propyleneoxy. Generally, any nonionic surfactant or mixture may be used.

Neither the nature of the nonionic surfactant nor the amount employed appears to be critical, provided the minimum amount approximates one molecular layer of surfactant over the approximate surface area of the finished catalyst. At concentrations significantly below this amount the stability of the dispersion drops and there may be a loss of catalyst activity. The procedure for calculating these values is well documented in the published literature and known to those skilled in the art. Thus, it is known that the approximate surface area of the surfactant is about 15 square Angstroms per surfactant molecule; knowing the surface area of the amount of dispersion aid and catalyst composition one readily calculates the minimum amount of the surfactant needed to approximately cover the surface area of the catalyst. Use of an excess amount of surfactant is not deleterious.

Further illustrative of typical nonionic surfactants are the following:

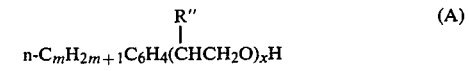

(A)

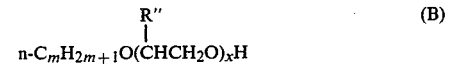

(B)

(C)

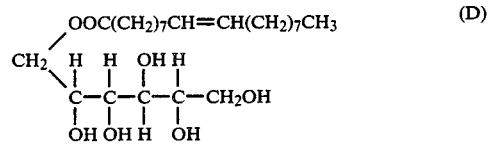

(D)

where:
x = 2-20
m = 4-18
R" = H or alkyl of at least 1 carbon atom, preferably from 1 to about 25 carbon atoms.

The amount of surfactant used should preferably be a minimum of one monolayer of the surface area (1–200+m$^2$/g BET/N$_2$) of the finished catalyst.

In preparing the catalyst composition the order of addition of reactants is not critical. Illustratively, the reactor is charged with hydrocarbon diluent and dispersion aid, purged with an inert gas (e.g., nitrogen, argon) and to this mixture is added in any sequence, or as a mixture, the polyol and the surfactant and the mixture is stirred for a short while to form a dispersion of a liquid polar material in the non-polar medium. The zinc compound, either neat or in hydrocarbon diluent, is added as rapidly as possible while maintaining the desired temperature by adequate cooling means, and while stirring. The reaction produces the solid zinc alkoxide dispersion catalyst composition and an alkane; the alkane vents off if it is a low boiling gas; if it is a liquid, it can either be removed or permitted to remain as part of the hydrocarbon diluent. After all components have been added, the mixture is stirred for an additional period of time to assure as complete reaction as possible to the zinc dialkoxide. It is most important that the entire reaction is carried out under conditions that exclude moisture, oxygen and reactive materials, other than the reactants, from the system. This is easily accomplished by continuous purging with a dry inert gas of high purity, e.g., nitrogen. The resulting product is a fine particle dispersion of the solid zinc alkoxide and the dispersion aid in the hydrocarbon diluent. This dispersion is the catalyst composition; if desired it can be further treated to remove the diluent (readily accomplished by known procedures) and the catalyst can be recovered as a fine, free flowing powder that is preferably stored under an inert atmosphere. If desired, it can be shaped into a pellet, tablet, or other shaped article.

The rate of dihydrocarbyl zinc compound addition has an effect on the properties of the catalyst. Too slow addition will generally result in a catalyst of low activity in the alkylene oxide polymerization reaction. It is preferred to add the dialkyl zinc compound as rapidly as possible while maintaining a constant reaction temperature through adequate cooling. It was observed this reaction temperature has an effect on the activity of the resulting catalyst. A high reaction temperature, above about 60° C., yields a catalyst of modest activity, about 10,000 to 20,000 g of polyethylene oxide per hour per g atom zinc, while a catalyst prepared at a lower temperature, about 10° C., can be exceptionally active, up to more than 200,000 g of polyethylene oxide per hour per g-atom zinc.

If desired, the reaction can be carried out by simultaneously adding separate streams of a dispersion of the silica dispersion aid, polyol and surfactant in a diluent and the dihydrocarbyl zinc compound in a diluent, in carefully controlled stoichiometry, to a reactor. Thus, better temperature control can be realized. In laboratory scale reactions the addition time varied from about 2 minutes up to about 20 minutes and was dependent upon the efficiency of the cooling means employed and stirring. Conventional external temperature control procedures were followed. In larger scale reactions, the addition time should be as short as possible and the addition of the zinc compound should be as rapidly as possible while maintaining the selected temperature by procedures known to the average engineer. It is obvious that large scale reactions may require longer periods of time since larger volumes are employed. One can also carry out the reaction in a tubular reactor by careful control of amounts of materials added and flowing through the tubular reactor followed by completion of the reaction in a stirred reactor, if necessary.

The temperature at which the catalyst is prepared can vary from about 0° C. or lower up to the boiling point of the hydrocarbon diluent in the reactor, preferably from about 0° C. to about 50° C., most preferably from about 0° C. to about 40° C.

Pressure is not critical in catalyst preparation and it can be subatmospheric, atmospheric or superatmospheric.

The time required for the reaction will vary depending upon the particular reactants employed, the temperature and size of the batch. Adequate time should be allowed to permit the reaction to go to completion. After all reactants have been introduced, the temperature can be raised to expedite the reaction and to assure its completion.

In preparing the zinc dialkoxide catalyst compositions of this reaction, the concentrations of polyol and zinc compound should be in a fairly exact stoichiometric amount. Sufficient zinc compound should be added to the polyol to react with all of the —OH groups that may be present in the silica (from SiOH), or other fumed metal oxide used, or in the surfactant molecule, or as trace quantities of water. In other words, the amount of dihydrocarbyl zinc compound added should be sufficient to react with the total active hydrogen groups present no matter from what source (e.g., hydroxyl, amine, water, etc.). This is important since neither $R_2Zn$, nor $RZnOCH_2$—, nor $HOCH_2CH_2O$— are active as polymerization initiators under the polymerization conditions. As a consequence, a fairly exact Zn atom/—OH stoichiometry is needed to yield a catalyst that is almost exclusively composed of —$CH_2CH_2$—O—Zn—O—$Ch_2Ch_2$—O— assemblies. Experimentally, it was found that an excess of one reagent or another (excess —OH or excess Zn) results in a catalyst of decreased activity or an inactive catalyst.

The relative amount of divalent dihydrocarbyl zinc compound added to the reaction mixture will depend on the total active hydrogen containing groups present. Depending upon the number of total active hydrogen-containing groups present, this can vary from about 1.8 to 2.2 mole equivalents of active hydrogen group per mole of divalent zinc compound, preferably from about 1.95 to 2.05 mole equivalents of active hydrogen groups per mole of divalent zinc compound, and most preferably from 1.99 to 2.01 mole equivalents of active hydrogen groups per mole of divalent zinc compound.

The concentration of the catalyst in the diluent can vary widely and can be as high as 50 weight percent or more of the dispersion. For ease of handling (stirring, transfer, etc.) a concentration of from about 10 to about 30 weight percent is more convenient.

The concentration of dispersion aid used is not critical and can vary from about 2 weight percent to about 25 weight percent of the zinc dialkoxide catalyst or more, on a dry basis, and it is preferably from about 10 weight percent to about 15 weight percent.

When produced as described above the catalyst composition is generally a stable dispersion of a very fine, white solid of zinc alkoxide and/or aryloxide and fumed silica dispersion aid dispersed in the hydrocarbon diluent. This dispersion is an excellent catalyst that polymerizes ethylene oxide at high rates and essentially quantitatively to high molecular weight resins; results that were completely unexpected and unpredictable. The particles in the dispersion are generally considerably smaller, from 5 to 10 times smaller, and more uniform in size and shape than are the particles obtained attempting to duplicate the procedures disclosed in Japan 45-07751 and Japan 78-27319 (Noda, Saigusa and Kajita) published March 18, 1970 and August 8, 1978, respectively. The particle size of the catalyst produced in accord with applicant's teachings was generally considerably less than 0.25 micron and in most instance averaged from about 0.07 to 0.1 micron in size. In contrast, the particle size of the particles produced using the methods disclosed in the Japanese patents averaged from about 0.5 to 1 micron in size. This difference, when comprising particles of this size of magnitude, is a considerable difference, as is recognized by one skilled in this art. That such uniformity and small particle size could be obtained by applicant was completely unexpected and unpredictable. The higher rates and yields of alkylene oxide polymer attainable by this invention are of significant commercial significance since it means that the residual concentration of zinc atom in the polymer is so small that further purification to remove the zinc is not necessary. Concentrations as low as about 0.003 gram atom or less per 1,000 g or more of finished polyethylene oxide have been attained.

It is recognized that though applicant has set forth procedures for producing the catalyst composition; nevertheless, it is also recognized that these are not the sole methods that may be used and one can make minor modifications thereto and still produce the improved, novel catalysts. It is also to be recognized that one can choose to isolate the solid catalyst from the dispersion and this isolated catalyst is equally useful for the production of the alkylene oxide polymers. Procedures for such isolation are known in the art.

Though the catalyst compositions produced as described above polymerize ethylene oxide at high rates with good yields, their use per se has no effect on the molecular weight of the polyalkylene oxide produced. The polymer, or copolymer, obtained has a high molecular weight, and as previously stated, requires subseguent treatment when lower molecular weights are desired.

The catalyst compositions prepared as described above when used in the process of this invention with the heretofore defined chain transfer agents polymerize the cyclic alkylene oxides to produce polymers of controlled molecular weight, either random or block, homopolymer or copolymer. During the polymerization process of this invention a very dilute solution of the chain transfer agent in an inert diluent is continuously added to the polymerizing mixture throughout the polymerization reaction period. One can also have present in the polymerization mixture reactive amounts of other known cyclic alkylene oxides, if one so desires, e.g., styrene oxide, butylene oxide, cyclohexene oxide, provided they do not unduly retard or interfere with the principal polymerization reaction.

The polymerization reaction can be carried out in any desired manner. It can be a batch, continuous or semi-continuous process or a combination thereof. The catalyst can be added all at one time, or in increments or continuously during the reaction; the monomer is preferably continuously fed to the reactor along with the dilute chain transfer agent solution. The polymerization can be carried out in bulk (in the absence of a solvent) or, preferably, in the presence of an inert solvent or diluent. Any of the known inert solvents or diluents can be used such as one or more of the saturated aliphatic and cycloaliphatic hydrocarbons, the aromatic hydrocarbons, and the like, for example, hexane, cyclohexane, octane, isooctane, benzene, toluene, xylene, petroleum ether, or any other solvent that is inert under the polymerization conditions.

One can also add after the polymerization reaction is complete any of the additives known to be usable that do not have a significantly deleterious effect on the reaction. These are so well known in the art that an extensive description is not warranted other than to say they include antioxidants, thermal stabilizers, light stabilizers, colorants, fillers, as well as materials one may wish to include in the polymer to achieve a desired objective.

The polymerization process can be carried out over a wide temperature that can range from about $-10°$ C. to about $100°$ C., preferably from about $0°$ C. to about $65°$ C. and more preferably from about $20°$ C. to about $45°$ C. These temperatures are known as suitable in the art and the temperature used is not critical for this invention.

The polymerization pressure is not critical; it can be subatmospheric, atmospheric or superatmospheric. Generally the polymerization reaction is carried out at autogenous pressure.

All reactions were carried out using clean and dry equipment, reactants that are essentially free of moisture or other polymerization inhibiting materials, and under an inert gas atmosphere. It is very important that the monomer should be a high purity polymerization grade material, otherwise prolonged induction periods are observed.

A catalytic amount of catalyst sufficient to polymerize the cyclic oxide is used. This can vary from about 0.001 mole percent zinc atom to about 1 mole percent zinc atom, based on the moles of cyclic oxide charged.

It is also possible to carry out the polymerization by conventional fluidized bed processes in the vapor phase. This technique has many advantages in that there is no need for a solvent, thus eliminating problems associated with handling, storage losses, removal and recycle; there is no need for filtration and drying steps; a continuous reaction system is used and lower catalyst usage and costs result. The fluidized bed polymerization processes are well known and exemplary thereof is the process described in U.S. Pat. No. 4,003,712, issued Jan. 18, 1977 to Adam R. Miller for the production of solid particulate olefin polymers. Similar processes are described in U.S. Pat. No. 4,001,382, issued Mar. 8, 1977 to Isaac J. Levine and Frederick J. Karol and in U.S. Pat. No. 4,354,009, issued on Oct. 12, 1982 to George L. Goeke et al.

In a typical embodiment of the fluidized bed polymerization, the medium free and dry catalyst is suspended in previously prepared, screened and nitrogen purged polyethylene oxide. On fluidization of the bed (in a fluid bed reactor) with gaseous ethylene oxide, or and ethylene oxide nitrogen (or other inert gas) mixture, the polymerization takes place. Proper feed control, temperature, recycle and recovery means are required to prevent fusion of the bed; all of these procedures being known to those of average skill in the art. In the fluidized bed process the chain transfer agent is preferably introduced in gaseous form. The catalyst can be neat, diluted with an inert carrier material or diluted with a polyalkylene oxide.

Solution viscosities were determined using a solution of the polymer at the concentration indicated in a 10 volume percent aqueous propanol solution at $25°$ C. The procedure for obtaining the solution viscosity may be found in Bulletin numbered F-44029C of June, 1982 published by the Union Carbide Corporation and entitled "POLYOX ® Water Soluble Resins Are Unique".

The polymerization rate was measured by removing liquid samples from time to time for analysis by gas chromatography using syringes cooled on dry ice. Gas chromatography analysis of these samples yields the percent unreacted ethylene oxide remaining in the hydrocarbon medium. A plot of percent monomer conversion versus time is prepared and a straight line through the origin and the 50 percent conversion product sample is made. The slope of this line yields the initial polymerization rate. The calculation is as follows for 40 g of monomer in 500 ml of hexane solution, 50 percent polymerized in 20 minutes, 0.005 mole atom zinc catalyst used:

$$\text{Initial Polymerization Rate} = \frac{20 \text{ g PEO}}{(0.33 \text{ hr})(0.005 \text{ m cat})}$$

$$= \frac{12,120 \text{ g PEO}}{\text{hr-mole catalyst}}$$

Particle size distribution was determined by using appropriate sieves and shaking for 10 minutes followed by weighing the residue on each sieve.

Gas chromatographic analysis was carried out using a dual column Hewlett-Packard 5880 gas chromatogram flame ionization atom detector. Basic board and a data processing program were used to convert the experimentally determined numbers to the various kinetic parameters. The gas chromatograph columns were $\frac{1}{8}$-inch in diameter and six feet long; they were packed with 20% CARBOWAX 20M® (high molecular weight polyethylene oxide) on 40/60 mesh Teflon®. Helium flow was 30 ml per minute at 225° C.; pressure was 60 psi; a 1 microliter liquid sample was used; injection port and detector temperatures were 300° C.

The following Experiments illustrate the preparation of the catalyst compositions.

EXPERIMENT 1

A 14.16 g portion of dried (at 200° C. for 24 hours) fumed silica (Aerosil 380 ®) was placed in a dry 1-liter, 3-necked, round bottomed flask equipped with a thermometer and egg-shaped plastic coated magnetic stirring bar. The flask was flushed with dry nitrogen and 450 ml of dry distilled (calcium hydride-nitrogen) hexane was added. The mixture was stirred and 25.58 g of 1.4-butanediol (containing 277 ppm water) was added to the slurry; after stirring for about 5 minutes, 16.8 g of the nonionic surfactant NP-10 ® (nonylphenol 10 mole ethoxylate adduct containing 0.42% water) was added. The slurry was stirred for three hours at 45° C. to yield a smooth dispersion. A 23.8% by weight solution of diethylzinc, containing 0.2872 mole of the zinc compound, in hexane was added to the dispersion within a two minute period, with cooling, at a temperature of 45° C. to 51° C. Rapid expulsion of ethane resulted. The white dispersion of zinc alkoxide/fumed silica reaction product in hexane was stirred an additional 18 hours at 45° C. The entire reaction sequence was conducted under a nitrogen atmosphere. The resulting product was an excellent catalyst for the polymerization of ethylene oxide to solid polymer.

EXPERIMENT 2

A series (Runs A-M) of catalyst compositions was prepared by following the general procedure described in Experiment 1. The quantities of materials added to the reactor and the yields are summarized in Table I. On addition of the 1,4-butanediol to the hexane-fumed silica, globs of oil floating in the fumed silica-hexane dispersion resulted; these yielded a white, milky dispersion over a two hour mixing period. If stirring was stopped, the phases separated. After addition of the surfactant (NP-10) and continued stirring for about 2 hours the dispersion was more stable than without the surfactant when stirring was stopped. The diethylzinc was added and reacted at about the temperature shown in Table I. In all runs a white dispersion of the substantially amorphous catalyst in the hydrocarbon medium was obtained as the final product. This dispersion was stored in a septum stoppered glass bottle. The reactants employed were those described in Experiment 1 with the exception that Run I was carried out using cyclohexane as the medium and, further, the reaction mixture was maintained at the boiling point of the medium after addition of the diethylzinc. In these catalyst preparation runs there was a sequential addition of 1,4-butanediol and surfactant. The data is summarized in Table I.

TABLE I

| Run | Fumed Silica g | Hexane ml | Butanediol g | NP—10 g | $(C_2H_5)_2Zn$ mole*** | Temp. °C. |
|---|---|---|---|---|---|---|
| A | 14.16 | 450 | 23.58 | 16.06 | 0.2871 | 47 |
| B | 12.86 | 450 | 24.71 | 16.34 | 0.2971 | 10 |
| C | 13.8 | 450 | 26.82 | 17.6 | 0.3256 | 60 |
| D | 12.73 | 450 | 25.54 | 16.08 | 0.3077 | 26 |
| E | 12.8 | 450 | 25.26 | 15.34 | 0.3036 | 28 |
| F | 12.6 | 450 | 24.23 | 19.1 | 0.2936 | 28 |
| G | 12.6 | 450 | 26.05 | 17.72 | 0.3145 | 49 |
| H* | 1.67 | 50 | 1.76 | 1.37 | 0.0219 | 45 |
| I | 11.92 | 314.8$^a$ | 25.1 | 16.28 | 0.3010 | 75 |
| J | 13.4** | 450 | 28.43 | 22.56 | 0.3437 | 22 |
| K | 12.54 | 450 | 26.67 | 18.89 | 0.3311 | 22 |
| L | 13.1 | 450 | 29.14 | 17.9 | 0.3481 | 23 |
| M | 11.24 | 450 | 28.71 | 12.05 | 0.3374 | 24 |

*100-ml flask used
**Aerosil-300 ®
***Assayed as about 25 weight percent solution in hexane
$^a$Cyclohexane medium

EXPERIMENT 3

The catalyst compositions were prepared using a variety of surfactants; these were

| | |
|---|---|
| n-$C_9H_{19}C_6H_4O(CH_2CH_2O)_{10}H$ (NP-10 ®) | S-1 |
| n-$C_9H_{19}C_6H_4O(CH_2CH_2O)_4H$ (NP-4 ®) | S-2 |

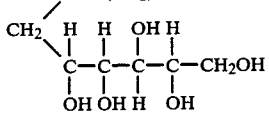

S-3 (Span 80 ®)

| | |
|---|---|
| n-$C_9H_{19}O(CH_2CH_2O)_9H$ (TERGITOL 15-S-9 ®) | S-4 |
| $(n-C_8H_{17})_2NH$ | S-5 |

The procedure followed was basically similar to that described in Experiment 2 using Aerosil-300 ® fumed silica in Run A and Aerosil-380 ® fumed silica in Runs B to E. The data is summarized in Table II.

TABLE II

| Run | Surfactant g | Fumed Silica | Hexane ml | Butane diol | $(C_2H_5)_2Zn$** mole | Temp. °C. |
|---|---|---|---|---|---|---|
| A | 22.56 (S1) | 13.4 | 450 | 28.43 | 0.3437 | 20–24 |
| B* | 41.38 (S2) | 44.5 | 2,000 | 103.58 | 1.1673 | 18–23 |
| C* | 7.12 (S3) | 10.2 | 500 | 26.14 | 0.2887 | 25–29 |
| D* | 15.33 (S4) | 10.9 | 500 | 25.80 | 0.2915 | 20–28 |
| E* | 6.34 (S5) | 11.0 | 500 | 25.84 | 0.2946 | 23–27 |

*The 1,4-butanediol and surfactant were premixed.
**As an about 25 weight percent solution in hexane.

All surfactants were capable of producing a stable, fine, white, small particle size catalyst dispersion as the final product.

EXPERIMENT 4

A catalyst composition was prepared by the simultaneous addition of 1,4-butanediol and surfactant to the fumed silica dispersion in hexane in order to evaluate whether or not it had an effect on the catalyst activity. Based on the results obtained in this experiment it was believed that whether simultaneous or sequential addition is used is of no consequence. The catalyst was produced following the procedure basically described in Experiment 2 using 12.78 g of fumed silica (Aerosil-380®), 43.3 g of a mixture that contained 1,4-butanediol (28.03 g) and the surfactant S-1 (NP-10®, 20.16 g), 500 ml hexane and 0.3056 mole of diethylzinc as an about 25 weight percent solution in hexane. The diethylzinc solution was added as rapidly as possible over an 8.3-minute period at 20°–22° C. A stable, fine, particle size dispersion of the catalyst was obtained.

Comparing these results with those of Run J of Experiment 2, in which the procedure was to sequentially add the 1,4-butanediol and then the surfactant to the hexane-fumed silica dispersion it is evident that the manner of addition offers no advantage of significance since in both instances good catalyst dispersions were obtained.

EXPERIMENT 5

A series of catalyst dispersions was prepared, using different polyols, following the procedure basically described in Experiment 2 to ascertain the effect of the polyol on catalyst dispersion and on the polymerization rate. Note that Run C in this experiment corresponds to Run J of Experiment 2 and used fumed silica Aerosil-300®.

It was observed that in all instances a stable, fine, white, fine particle size dispersion was obtained with the exception of the product of Run I which tended to turn yellow on standing. The data is summarized in Table III. The surfactant used was S-1 in all instances, except Run H that used S-2. In Runs E and H a premixed mixture of surfactant and polyol was added to the reactor. The diethylzinc was added as an about 25 weight percent solution in hexane.

TABLE III

| Run | * | Polyol g | Surfactant g | Fumed Silica g | Hexane ml | $(C_2H_5)_2Zn$ mole | Temp. °C. |
|---|---|---|---|---|---|---|---|
| A | a | 21.93 | 20.24 | 12.1 | 500 | .3779 | 20–27 |
| B | b | 24.99 | 18.01 | 12.92 | 500 | .3525 | 21–27 |
| C | c | 28.43 | 22.56 | 13.4 | 450 | .3437 | 20–24 |
| D | d | 28.95 | 18.43 | 14.28 | 500 | .3058 | n.a. |
| E | e | 33.0 | 18.09 | 13.86 | 500 | .3058 | 19–23 |
| F | f | 21.07 | 18.12 | 12.8 | 500 | .2226 | 22–26 |
| G | g | 40.52 | 18.07 | 11.89 | 500 | .3250 | 19–24 |
| H | h | (x) | (x) | 10.9 | 500 | .3471 | 15–25 |
| I | i | 5.97 | 5.10 | 13.66 | 500 | .3453 | 17–24 |

* a ethanediol;
b 1,3-propanediol;
c 1,4-butanediol;
d 1,5-pentanediol;
e 1,6-hexanediol;
f diethylene glycol;
g di-isopropylene glycol;
h glycerine;
i water
(x) Added 38.76 g of a mixture of 55.71 g of glycerine and 44.29 g of S2
n.a. Not available

EXPERIMENT 6

Different sources of fumed silica were evaluated for the preparation of the catalyst dispersion. Regardless of the source very active catalysts were produced that were stable, white, fine dispersions. The procedure was basically similar to that described in Experiment 2 using surfactant S-1 (NP-10). The diethylzinc was added as an approximately 25 weight percent solution in hexane. The data is summarized in Table IV.

TABLE IV

| Run | * | Formed Silica g | Surfactant g | 1,4-Butanediol g | Hexane ml | $(C_2H_5)_2Zn$ mole | Temp. °C. |
|---|---|---|---|---|---|---|---|
| A | a | 46.5 | 101.65 | 73.11 | 2,000 | 1.2271 | 17–21 |
| B | b | 14.76 | 24.99 | 17.97 | 500 | 0.2955 | 20–35 |
| C | c | 13.0 | 25.41 | 8.31 | 500 | 0.3090 | 19–23 |
| D | d | 12.39 | 25.64 | 17.91 | 500 | 0.3251 | 17–20 |

* a Degussa Aerosil-380$^R$
b Degussa Aerosil-130$^R$
c Cabot Cab-O-Sil EH-5$^R$
d PQ Corp. PQ-CD-2040$^R$ The above Experiments illustrate the preparation of the dialkoxode zinc catalyst dispersions. The following Examples are presented to further illustrate this invention.

EXAMPLE 1

To a 22-liter, four-necked, round bottom glass reactor, equipped with an addition funnel, dry-ice condenser, five-inch paddle stirrer, thermometer and nitrogen purge lines, sitting in a cooling bath, there were added 12,100 ml of hexane (containing 0.013 equivalent of —OH from moisture) and 398 g of fumed silica (Aerosil-380®; 1.0176 equivalents of —OH from SiOH and moisture). The fumed silica was dispersed with modest stirring and a good, clean, dry nitrogen purge to remove oxygen. To this milky dispersion were added 313 g of the surfactant S-2 the adduct of 4 moles of ethylene oxide with n nonylphenol (containing 0.8203 equivalent of —OH) and 936 g of 1,4-butanediol (20.775 equivalents of —OH) and stirring, under a nitrogen blanket, was continued for 3.5 hours. A 25.4 weight percent solution of diethylzinc in hexane (7,392 ml, 11.392 moles) was added at the rate of 176 ml/minute while applying an ice bath to the reactor to maintain a 25° C. to 30° C. temperature. There was produced a white dispersion of the zinc alkoxide catalyst in hexane with copious evolution of ethane.

EXAMPLE 2

Run A—The polymerization reactor used was a 5-liter, four-necked, round bottom glass flask equipped with a thermometer, paddle stirrer, dry-ice condenser, liquid sample tube and gaseous ethylene oxide inlet tube. The glassware was dried in a 135° C. air oven, assembled, purged thoroughly with clean, dry, oxygen-free nitrogen and thereafter kept under a nitrogen blanket. Hexane, 3500 ml, that had previously been nitrogen purged and put through a molecular sieve bed to remove water, was transferred into the reactor and purged with nitrogen for 0.5 hour. This was saturated with dried ethylene oxide at 30° C. A 7 ml portion of the blend of zinc alkoxide dispersion described in Example 8 (0.004 mole Zn) was added and within 5 minutes the polymerization commenced as evidenced by the appearance of white polymer particles. After waiting an additional 5 minutes, using a piston pump, a 0.804 weight percent solution of isopropanol in hexane was continuously added at the rate of 25.7 ml per hour. The polymerization was continued for another 4.17 hours at 28° C. to 29° C. with continuous addition of ethylene oxide monomer as needed to maintain a concentration of about 11 weight percent monomer in the reaction medium during the reaction. A heavy white slurry of polyethylene oxide resulted. The polymerization reaction was terminated by addition of 10 ml of isopropanol in 25 ml of hexane to which 0.5 g of 2,6-di-t-butyl-p-cresol was added as oxidative degradation stabilizer. The polymer was recovered by filtration and dried at 30° C. at a pressure of 25 mm Hg. The yield was 193 g. The polyethylene oxide had a molecular weight of $1.35 \times 10^6$ as measured as a 2 percent aqueous solution (1,140 cps). The overall reaction rate was 11,600 g polyethylene oxide per hour per g-mole zinc alkoxide. The calculated number of moles of isopropanol added was 0.0484 mole per 1,000 g of polymer produced.

Run B. For comparative purposes a polymerization reaction was carried out using the same equipment and essentially the same conditions set forth in Run A with the major difference being that there was no addition of the isopropanol hexane solution during the polymerization reaction. The polymerization was continued for 3.48 hours before termination. The yield was 471.3 g. The polyethylene oxide had a molecular weight of $9 \times 10^6$ as measured as a 1 percent aqueous solution (19,550 cps). The molecular weight of this polymer was about 6.7 times greater than that of the polymer produced in Run A illustrating the molecular weight control achieved in Run A by the process of this invention. The overall reaction rate was 39,400 g polyethylene oxide per hour per g-mole zinc alkoxide.

Run C. To demonstrate the effect of a carboxylic acid on the polymerization reaction, the isopropanol was replaced by acetic acid.

An ethylene oxide polymerization reaction was attempted in the same manner as described in Run A, except that a 0.93 weight percent acetic acid solution in hexane was added at a rate of 36 ml per hour. This addition brought the polymerization to a rapid end; no polymer was produced after about 0.23 g of acetic acid (36 ml of solution) had been added. The acetic acid appeared to function as a chain terminator without formation of any new active sites capable of continuing the reaction.

EXAMPLE 3

An ethylene oxide polymerization was carried out in the same manner as described in Run A of Example 2, except that a 0.452 weight percent solution of isopropanol in hexane was added at a rate of 31.8 ml per hour for 8.35 hours. During this period ethylene oxide was continuously fed into the reactor to maintain an about 11 weight percent ethylene oxide concentration in the reaction mixture throughout the polymerization. The reaction was terminated as described in Run A of Example 2 and a yield of 507 g of polyethylene oxide having a molecular weight of $2.1 \times 10^6$ was recovered (1 percent aqueous solution viscosity was 400 cps). The overall reaction rate was 15,300 g polyethylene oxide per hour per g-mole zinc alkoxide. The calculated number of moles of isopropanol added was 0.0395 mole per 1000 g of polyethylene oxide produced.

EXAMPLE 4

A catalyst dispersion was prepared in a dry, clean, nitrogen flushed 5 liter round-bottom flask equipped with a paddle stirrer, thermometer, dry-ice condenser and cooling bath. A slurry of 41.2 g of Aerosil-380® (dried 18 hours at 200° C.) in 2,000 ml of n-hexane (molecular sieve dried) that had been purged with dry nitrogen was prepared in the flask by stirring under a nitrogen purge. Then 144.74 g of a mixture of 72.25 weight percent 1,4-butanediol and 27.75 weight percent surfactant S-1 (NP-4) was added and the mixture was stirred for 2 hours with a nitrogen purge. A 25 weight percent solution of diethylzinc (1.2604 moles) in hexane was added over a seven minute period with good stirring at 32° C. to 35° C. and stirring was continued for another 2 hours. The fine, white dispersion of the solid catalyst was then bottled.

EXAMPLE 5

The catalyst dispersion of Example 4 was used to evaluate the effect of continuous addition of n-propanol solutions in increasing amounts to the polymerization reaction. It was noted that as the amount added to the reaction increased, resulting in an increase in the amount n-isopropanol introduced per 1,000 g of polyethylene oxide produced, the molecular weight of the polyethylene oxide produced tended to decrease, and in all instances the molecular weight was lower than that obtained in the absence of n-propanol. Except for Run E of Table V, the continued decrease in molecular weight is apparent. No reasonable explanation for the anomolous result in Run E could be reached other than that it may be due to the larger amount of catalyst used.

It was also observed that the polymerization rate decreased as the amount of n-isopropanol added increased except in the case of Runs F and G of Table V for which no reasonable explanation could be reached.

The polymerization reactions of Runs A to K in this Example were conducted under the conditions described here. A five liter, four-necked flask was dried at 135° C., nitrogen cooled and equipped with two dry-ice condensers, thermometer and a plastic-bladed stirrer. A rubber-tipped adapter was inserted such that the tip was about 2.5 cm above the 3,500 ml liquid level in the reactor. The reactor was purged with clean, dry, oxygen-free nitrogen and 3,500 ml of hexane added followed by nitrogen purging for one-half hour below the surface. Gaseous ethylene oxide was bubbled into the hexane to saturation at 30° C. to five an about 11 weight percent solution of the ethylene oxide in the hexane. Two gas chromatogram samples were taken prior to the catalyst addition using gas chromatogram syringes that had been cooled by placing them on a block of dry-ice in order to avoid vapor-lock on sampling. This technique was used whenever sampling was performed. The amount of catalyst dispersion indicated in Table V for each run was then added by syringe and the polymerization was carried out at about 30° C. After the initial induction period ethylene oxide was fed into the reactor to maintain an approximately 10 weight percent concentration of this monomer in the hexane. Simultaneously, using a piston pump, an approximately one weight percent solution of n-propanol in hexane was continuously added at the rate indicated in Table V. During the reaction syringe samples were taken for analysis and the temperature was controlled by external cooling of the reactor. The reaction was terminated by addition of 5 ml of isopropanol containing 0.5 g of 2,6-di-t-butyl-p-cresol dissolved in 25 ml of hexane. In all instances the resulting white polyethylene oxide slurry was filtered under nitrogen, vacuum dried and stored under nitrogen. The data and results are summarized in Table V.

TABLE V

| Run | Catalyst Charged Mole Zn | Induction Period min. | PA Fed ml/min. | PA Fed mole | Reaction Time hours |
|---|---|---|---|---|---|
| A | 0.004 | 5 | 0.44 | 0.0674 | 7.5 |
| B | 0.004 | 10 | 0.42 | 0.0421 | 5.2 |
| C | 0.004 | 7 | 0.43 | 0.0372 | 5.4 |
| D | 0.004 | 6 | 0.53 | 0.0305 | 4.8 |
| E | 0.009 | 2 | 0.51 | 0.0196 | 5.0 |
| F | 0.004 | 3 | 0.53 | 0.0155 | 3.1 |
| G | 0.010 | 6 | 0.55 | 0.0134 | 2.6 |
| H | 0.004 | 11 | 0.44 | 0.0070 | 2.6 |
| I | 0.004 | 13.5 | 0.28 | 0.0019 | 5.2 |
| J | 0.004 | 12 | None | None | 2.2 |
| K | 0.004 | 10 | None | None | 2.3 |

| Run | Yield g | PA Feed, mole per 1000 g PEO | Rate * | PEO MW ($\times 10^{-6}$) | Initial Viscosity cps |
|---|---|---|---|---|---|
| A | 506 | 0.1332 | 16,900 | 0.46 | 4,430(a) |
| B | 365 | 0.0115 | 17,500 | 1.3 | 1,145(b) |
| C | 492 | 0.0756 | 22,800 | 1.3 | 6,000(b) |
| D | 464 | 0.0657 | 24,200 | 1.0 | 475(b) |
| E | 1,107 | 0.0177 | 24,700 | 2.5 | 845(c) |
| F | 484 | 0.0320 | 39,100 | 1.8 | 2,610(b) |
| G | 435 | 0.0308 | 16,700 | 2.0 | 3,220(b) |
| H | 469 | 0.0149 | 45,100 | 2.4 | 8,020(b) |
| I | 520 | 0.0037 | 25,000 | 6.3 | 8,240(c) |
| J | 499 | None | 56,700 | 9.0 | 18,200(c) |
| K | 534 | None | 58,000 | 8.4 | 16,620(c) |

PA - n-propanol
*g PEO/hr - g at Zn
(a)5% concentration
(b)2% concentration
(c)1% concentration

EXAMPLE 6

A series of ethylene oxide polymerizations was carried out using the zinc dialkoxide catalyst dispersion of Run A of Experiment 6. In this series the amount of n-propanol (Runs A to D) added to the reaction was varied and methanol (Run E) and t-butanol (Run F) were also evaluated in separate runs. The reactions were carried out following the procedure described in Example 5. In all instances the polyethylene oxide (PEO) resins produced had molecular weights lower than those obtained in Runs J and K of Example 5 in which there was no chain transfer agent used. The data and results are summarized in Table VI.

TABLE VI

| Run | Catalyst Charged Mole Zn | Induction Period min. | CTA Fed ml/min. | CTA Fed mole | Reaction Time hours |
|---|---|---|---|---|---|
| A | 0.003 | 15 | 0.41 | 0.0276 | 5.75 |
| B | 0.004 | 4 | 0.54 | 0.0346 | 6.0 |
| C | 0.004 | 2 | 0.53 | 0.0098 | 2.9 |
| D | 0.008 | 2 | 0.48 | 0.0063 | 1.7 |
| E | 0.004 | 10 | 0.56 | 0.0132 | 3.4 |
| F | 0.004 | 5 | 0.38 | 0.0088 | 3.7 |

| Run | Yield g | CTA Feed, mole per 1000 g PEO | Rate * | PEO MW ($\times 10^{-6}$) | Initial Viscosity cps |
|---|---|---|---|---|---|
| A | 568 | 0.0486 | 32,900 | 1.3 | 1,360(b) |
| B | 480 | 0.0721 | 20,000 | 1.6 | 145(c) |
| C | 500 | 0.0196 | 43,100 | 2.4 | 655(c) |
| D | 509 | 0.0124 | 36,800 | 3.0 | 1,430(c) |
| E | 187 | 0.0706 | 13,800 | 0.53 | 6,780(a) |
| F | 498 | 0.0177 | 33,600 | 3.3 | 1,905(c) |

CTA - Chain transfer agent
Runs A-D n-propanol
Run E - methanol
Run F - t-butanol
*g PEO/hr - g at. Zn
(a)5% concentration
(b)2% concentration
(c)1% concentration

EXAMPLE 7

A series of ethylene oxide polymerizations was carried out (using a portion of the catalyst described in Example 8) following the procedure described in Example 5 and using isopropanol as the chain transfer agent to further illustrate the effect of this chain transfer agent in controlling the molecular weight. For comparative purposes two runs were carried out without added isopropanol (Runs E and F). The data and results are summarized in Table VII.

TABLE VII

| Run | Catalyst Charged Mole Zn | Induction Period min. | IPA Fed ml/min. | IPA Fed mole | Reaction Time hours |
|---|---|---|---|---|---|
| A | 0.00366 | 9 | 0.50 | 0.0038 | 5.4 |
| B | 0.0082 | 36 | 0.76 | 0.0194 | 2.8 |
| C | 0.0115 | 20 | 0.62 | 0.0313 | 4.03 |
| D | 0.0181 | 13 | 0.76 | 0.10 | 4.2 |
| E | 0.009 | 5 | None | None | 2.0 |
| F | 0.0047 | 3 | None | None | 3.4 |

| Run | Yield g | CTA Feed, mole per 1000 g PEO | Rate * | PEO MW ($\times 10^{-6}$) | Initial Viscosity cps |
|---|---|---|---|---|---|
| A | 406 | 0.0094 | 19,000 | 3.4 | 1,880(c) |
| B | 261 | 0.0743 | 9,660 | 1.4 | 1,200(b) |
| C | 502 | 0.0624 | 10,800 | 2.5 | 7,600(b) |
| D | 389 | 0.258 | 5,100 | 1.5 | 1,400(b) |
| E | 518 | None | 28,800 | 9.0 | 19,500(c) |
| F | 471 | None | 29,200 | 9.0 | 19,550(c) |

IPA - isopropanol
*g PEO/hr - g at. Zn
(b)2% concentration
(c)1% concentration

The results show that addition of isopropanol enabled control of molecular weight and the ability to produce a lower molecular product ranging from 1,400,000 to 3,400,000 as compared to 9,000,000 in the absence of the isopropanol chain transfer agent.

EXAMPLE 8

The catalyst used in Example 7 was a portion of the blend obtained from five catalyst production runs carried out in a manner similar to that described in Example 1. After the five runs were completed, the catalyst dispersions were combined, thoroughly mixed and stored under an inert gas atmosphere. The reagents and reaction conditions are summarized in Table VIII.

TABLE VIII

| Run | A | B | C | D | E |
|---|---|---|---|---|---|
| Aerosil 380, g | 402 | 403 | 406 | 398 | — |
| Aerosil 360, g | — | — | — | — | 399 |
| Hexane, ml | 7840 | 7885 | 7790 | 7742 | 7659 |
| NP—4 Surfactant | 320 | 319 | 320 | 315 | 313 |
| 1,4-Butanediol | 943 | 946 | 941 | 955 | 940 |
| Diethylzinc, mole[a] | 11.488 | 11.521 | 11.471 | 11.607 | 11.438 |
| Temperature, °C. | 19-31 | 19-31 | 23-32 | 21-32 | 21-33 |

TABLE VIII-continued

| Run | A | B | C | D | E |
|---|---|---|---|---|---|
| Addition Time, min. | 39 | 39 | 37 | 42 | 42 |

(a)As an about 25 weight percent solution in hexane

The need for the addition of the dilute solution of the chain transfer agent continuously throughout the polymerization reaction rather than its addition in incremental portions at intervals during the reaction was shown in the following experiment carried out in a five liter reactor prepared and equipped as described in Example 2. Hexane, 3,500 ml, was added, the reactor was purged, and the hexane was saturated with ethylene oxide at 30° C. A 27 ml portion (0.007 mole Zn) of the zinc alkoxide catalyst dispersion of Run M of Experiment 2 was added and the polymerization commenced. Nine minutes later 8.82 g of a 3.6 weight percent solution of n-propanol in hexane was added. Analysis of the reaction mixture showed an immediate and steep drop in the reaction rate to almost zero, followed by a gradual recovery to approximately the rate prior to the alcohol addition. Monitoring the alcohol concentration it was found that there was a gradual decrease of propanol concentration over a 30 to 40 minute period after the addition of the alcohol to a substantially zero alcohol content and only then does the polymerization rate become appreciable again. These phenomena were observed with each addition of n-propanol in incremental portions. The first increment was added nine minutes after the addition of the catalyst dispersion; the second 8.9 g increment was added 43 minutes after catalyst addition; the third 8.97 g increment was added 94 minutes after catalyst addition. The observations show that incremental addition is not conducive to a smooth continuous reaction rate but serves to have a poisoning effect on the reaction that slows the polymerization rate until the alcohol has substantially disappeared.

What I claim is:

1. A process for controlling the molecular weight of polyalkylene oxides which comprises continuously feeding during the polymerization reaction a diluted chain transfer agent, said chain transfer agent havinq a pKa value of from 9 to 22, to a polymerizing mixture comprising a cyclic oxide of the formula

wherein R' is hydrogen or alkyl of 1 to 20 carbon atoms and a catalytic amount of a catalyst comprising the reaction product of a zinc compound of the general formula $R_2Zn$ wherein R is
 (i) an alkyl group containing from 1 to about 8 carbon atoms; or
 (ii) an unsubstituted or alkyl-substituted phenyl or naphthyl group; or
 (iii) a cycloalkyl group having from 4 to 6 ring carbon atoms; or
 (iv) a dicyclopentadienyl group
with an alkane polyol having from 2 to about 6 carbon atoms in the alkane chain, or a cycloalkane diol having 5 or 6 ring carbon atoms in contact with a silica dispersion aid and nonionic surfactant in an inert medium.

2. A process as claimed in claim 1, wherein said transfer agent has a pKa value of from 14 to 20.

3. A process as claimed in claim 1, wherein said transfer agent has a pKa value of from 15 to 19.

4. A process as claimed in claim 2, wherein said dispersion and is fumed silica.

5. A process a claimed in claim 1, wherein said chain transfer agent is added to the polymerizing mixture in the form of a dilute solution of the chain transfer agent in an inert liquid medium.

6. A process as claimed in claim 1 wherein the chain transfer agent has the general formula R'''OH wherein R''' is an alkyl group having from 1 to 16 carbon atoms.

7. A process as claimed in claim 6 wherein R''' is an alkyl group having from 1 to 8 carbon atoms.

8. A process as claimed in claim 6, wherein R''' is an alkyl group having from 1 to 4 carbon atoms.

9. A process as claimed in claim 1, wherein the concentration of the chain transfer agent in the inert liquid medium is below about three percent by weight.

10. A process as claimed in claim 9, wherein said concentration is up to about one percent by weight.

11. A process as claimed in claim 6, wherein the chain transfer agent is selected from the group consisting of methanol, ethanol, n-propanol, isopropanol, n-butanol, isobutanol and t-butanol.

12. A process as claimed in claim 6, wherein the amount of chain transfer agent added to the polymerizing mixture is from about 0.005 to about 0.4 mole per 1,000 g of polyalkylene oxide produced.

13. A process as claimed in claim 6, wherein the amount of chain transfer agent added to the polymerizing mixture is from about 0.01 to about 0.15 mole per 1,000 g of polyalkylene oxide produced.

14. A process as claimed in claim 6, wherein the rate of continuous feed of the chain transfer agent solution to the polymerizing mixture is at a rate which does not terminate the polymerization reaction.

15. A process as claimed in claim 6, wherein the fumed silica has an average particle size of less than about 0.5 micron.

16. A process as claimed in claim 6, wherein the fumed silica has a surface area of from about 10 to about 600 $m^2/g$ BET/$N_2$.

17. A process as claimed in claim 6, wherein the zinc compound is diethylzinc.

18. A process as claimed in claim 6, wherein the alkanediol is 1,4-butanediol.

19. A process as claimed in claim 6, wherein the zinc compound is diethylzinc and the alkanediol is 1,4-butanediol.

20. A process as claimed in claim 6, wherein the alkanediol is diethylene glycol.

21. A process as claimed in claim 6, wherein the cyclic oxide is ethylene oxide.

22. A process as claimed in claim 21, wherein the fumed silica has an average particle size of less than about 0.5 micron.

23. A process as claimed in claim 21, wherein the fumed silica has a surface area of from about 10 to about 600 $m^2/g$ BET/$N_2$.

24. A process as claimed in claim 21, wherein the zinc compound is diethylzinc.

25. A process as claimed in claim 21, wherein the alkanediol is 1,4-butanediol.

26. A process as claimed in claim 21, wherein the zinc compound is diethylzinc and the alkanediol is 1,4-butanediol.

27. A process as claimed in claim 21, wherein the alkanediol is diethylene glycol.

28. A process as claimed in claim 6, wherein the cyclic oxide is propylene oxide.

29. A process as claimed in claim 6, wherein a mixture of ethylene oxide and propylene oxide comprises the cyclic oxide.

30. A process as claimed in claim 1, wherein said chain transfer agent is added to the polymerization mixture in the form of a qaseous vapor.

31. A process as claimed in claim 1 wherein said chain transfer agent is added to the polymerizing mixture in admixture with the cyclic oxide.

32. A process as claimed in claim 1, wherein said polymerization reaction is carried out in a fluidized bed process at a temperature below the fusion temperature of the cyclic oxide polymer by contacting said cyclic oxide with fluidized particles of said catalyst, supported on a carrier or unsupported, and said chain transfer agent is added to the fluidized bed in the form of a gaseous vapor.

33. A process as claimed in claim 32, wherein said transfer agent is added to the fluidized bed in gaseous vapor form in admixture with the cyclic oxide.

34. A process as claimed in claim 6, wherein said polymerization reaction is carried out in a fluidized bed process at a temperature below the fusion temperature of the cyclic oxide polymer by contacting said cyclic oxide with fluidized particles of said catalyst, supported on a carrier or unsupported, and said chain transfer agent is added to the fluidized bed in the form of a gaseous vapor.

35. A process as claimed in claim 7, wherein said polymerization reaction is carried out in a fluidized bed process at a temperature below the fusion temperature of the cyclic oxide polymer by contacting said cyclic oxide with fluidized particles of said catalyst, supported on a carrier or unsupported, and said chain transfer agent is added to the fluidized bed in the form of a gaseous vapor.

36. A process as claimed in claim 8, wherein said polymerization reaction is carried out in a fluidized bed process at a temperature below the fusion temperature of the cyclic oxide polymer by contacting said cyclic oxide with fluidized particles of said catalyst, supported on a carrier or unsupported, and said chain transfer agent is added to the fluidized bed in the form of a gaseous vapor.

* * * * *